United States Patent
Reichwein et al.

(10) Patent No.: US 8,298,650 B2
(45) Date of Patent: Oct. 30, 2012

(54) HOLLOW BASE DECORATIVE SURFACE COVERING

(75) Inventors: David P. Reichwein, Elizabethtown, PA (US); Keith A. Pocock, Shanghai (CN)

(73) Assignee: GIP International Limited, Central Hong Kong (HK)

( * ) Notice: Subject to any disclaimer, the term of this patent is extended or adjusted under 35 U.S.C. 154(b) by 0 days.

(21) Appl. No.: 12/923,369

(22) Filed: Sep. 16, 2010

(65) Prior Publication Data

US 2011/0076457 A1    Mar. 31, 2011

Related U.S. Application Data

(60) Provisional application No. 61/277,490, filed on Sep. 26, 2009.

(51) Int. Cl.
*B32B 3/00*   (2006.01)
*B32B 3/12*   (2006.01)
*B32B 1/00*   (2006.01)

(52) U.S. Cl. .......... 428/156; 428/174; 428/178

(58) Field of Classification Search .......... 428/156, 428/158, 159, 160, 172, 187, 174, 178, 99; 15/215; 4/581, 582, 583; 5/417; 52/578, 52/506.01
See application file for complete search history.

(56) References Cited

U.S. PATENT DOCUMENTS

| | | | |
|---|---|---|---|
| 2,081,992 A | 3/1936 | Gavlak | |
| 4,698,258 A | 10/1987 | Harkins, Jr. | |
| 5,059,474 A | 10/1991 | Yoshida | |
| RE34,357 E | 8/1993 | Eckert et al. | |
| 6,006,486 A | 12/1999 | Moriau et al. | |
| 6,014,779 A | 1/2000 | Lindholm | |
| 6,167,879 B1 | 1/2001 | Sievers et al. | |
| 6,656,562 B2 * | 12/2003 | Malpass et al. | 428/99 |
| 6,851,241 B2 | 2/2005 | Pervan | |
| 7,155,871 B1 | 1/2007 | Stone et al. | |
| 2005/0100711 A1 | 5/2005 | Malpass et al. | |
| 2009/0077917 A1 | 3/2009 | Lai | |
| 2011/0183101 A1 | 7/2011 | Voith et al. | |

FOREIGN PATENT DOCUMENTS

| | | |
|---|---|---|
| CN | 2392845 | 8/2000 |
| CN | 201318011 | 9/2009 |
| DE | 202006009037 | 8/2006 |
| JP | 11172906 | 6/1999 |
| KR | 1020070076771 | 7/2007 |

* cited by examiner

*Primary Examiner* — Catherine A Simone
(74) *Attorney, Agent, or Firm* — Duane Morris LLP

(57) ABSTRACT

This invention describes a decorative surface covering comprising at least one decorative layer and a backing layer comprising a patterned array of elastomeric, geometric projections, wherein each geometric projection comprises a concave exposed surface, an outside wall surface and an inside wall surface wherein the inside wall surface defines a hollow area within the projection. When the decorative surface covering is installed over an underlying surface, and pressure is applied to the decorative surface covering, a vacuum is created within the hollow area of the projections and the underlying surface. The vacuum increases the amount of frictional drag between the surface covering and the underlying surface, and thus allows the surface covering to remain in place without the need for an adhesive.

28 Claims, 4 Drawing Sheets

HOLLOW BASE DECORATIVE SURFACE COVERING

CROSS-REFERENCE TO RELATED APPLICATIONS

This application claims the benefit of U.S. Provisional Application No. 61/277,490, filed Sep. 26, 2009.

FIELD OF THE INVENTION

The present invention relates to decorative surface coverings, including flooring materials.

BACKGROUND OF THE INVENTION

Decorative surface coverings are typically installed upon a building surface. Resilient flooring products are typically adhered to a sub-floor surface using adhesives. These adhesives are either applied to the sub-floor, or in the cases of resilient tile products they can be applied to the back of the tile itself by the manufacturer. Flooring products must stay in place during use conditions which can include walking forces, dragging forces, rolling load forces, indentation forces, and sub-floor movement due to dimensional instability. Flooring products must stay flat, not curl, and seams, especially between tiles, must not move or open. Because of problems with adhesives, there have been many attempts to develop flooring products that do not require adhesives. Some of these have involved using "loose lay" constructions as taught in U.S. Pat. Nos. 4,698,258 and RE34,357. Additionally, many patents on physically interlocking tiles exist. A more recent U.S. Pat. No. 7,155,871 describes a two-sided ship-lap vinyl plank with adhesive located on the ship-lap surface. However, none of these have gained much commercial success and there remains a need for resilient decorative surface coverings that do not require adhesives.

When you look to nature for methods for adhering/holding things together, one can gain some inspiration from the gecko whose feet are equipped with fine "setae" on each toe. Each seta branches out into 1,000 even thinner stalks that are tipped with flat caps called spatulae, each about the size of a bacterium. The tentacles of the octopus contain numerous suction cups which are another example of nature's principles. Suction cups have been utilized in bath mat constructions as defined in U.S. Pat. Nos. 6,014,779 and 2,081,992, and US Patent Application No. 2005/0100711. While this approach provides acceptable slip-resistance for light shower and bath mat applications, traditional suctions cups are not sufficient to provide sufficient anti-skidding forces to prevent slipping and movement in high traffic and high load areas. Traditional suction cups also result in a wavy mat surface which is more difficult for individuals and loads to traverse. The teachings of these patents have not been successfully utilized in traditional flooring products.

SUMMARY OF THE INVENTION

The present invention provides a decorative surface covering comprising at least one decorative layer and a backing layer comprising a patterned array of elastomeric, geometric projections, wherein each geometric projection comprises a concave top surface, an outside wall surface, and an inside wall surface, wherein the inside wall surface defines a hollow area within the projection. When the decorative surface covering is installed over an underlying surface, and pressure is applied to the decorative surface covering, a vacuum is created within the hollow area of the projections and the underlying surface. The vacuum increases the amount of frictional drag between the surface covering and the underlying surface, and thus allows the surface covering to remain in place without the need for an adhesive.

In one embodiment, the decorative layer is a flooring material.

In another embodiment, the decorative layer is selected from the group including, a resilient tile, plank, or sheet flooring structure, and a laminate plank or tile structure.

In another embodiment, the geometric projections comprise, triangles, squares, rectangles, ovals, circles, pentagons, hexagons, other polygons, or mixtures thereof.

In another embodiment the geometric projections are symmetrical with dimensions essentially equal in both longitudinal and transverse directions.

In another embodiment the pattern array of geometric projections is organized in rows parallel to the edges of the decorative layer and separated from each other by a defined distance.

In another embodiment the alternating rows of the pattern array are offset from each other by a defined distance.

In yet another embodiment a Luxury Vinyl Tile or Plank Flooring is provided comprising a backing layer having a patterned array of elastomeric, geometric projections, wherein each geometric projection comprises a concave top surface, an outside wall surface and an inside wall surface wherein the inside wall surface defines a hollow area within the projection.

In another embodiment a backing layer is provided comprising a patterned array of elastomeric, geometric projections, wherein each geometric projection comprises a concave top surface, an outside wall surface and an inside wall surface wherein the inside wall surface defines a hollow area within the projection.

DETAILED DESCRIPTION

This invention describes a decorative surface covering comprising at least one decorative layer and a backing layer comprising a patterned array of elastomeric, geometric projections, wherein each geometric projection comprises a concave exposed surface, an outside wall surface and an inside wall surface wherein the inside wall surface defines a hollow area within the projection. When the decorative surface covering is installed over an underlying surface, and pressure is applied to the decorative surface covering, a vacuum is created within the hollow area of the projections and the underlying surface. The vacuum increases the amount of frictional drag between the surface covering and the underlying surface, and thus allows the surface covering to remain in place without the need for an adhesive.

Figure 1:
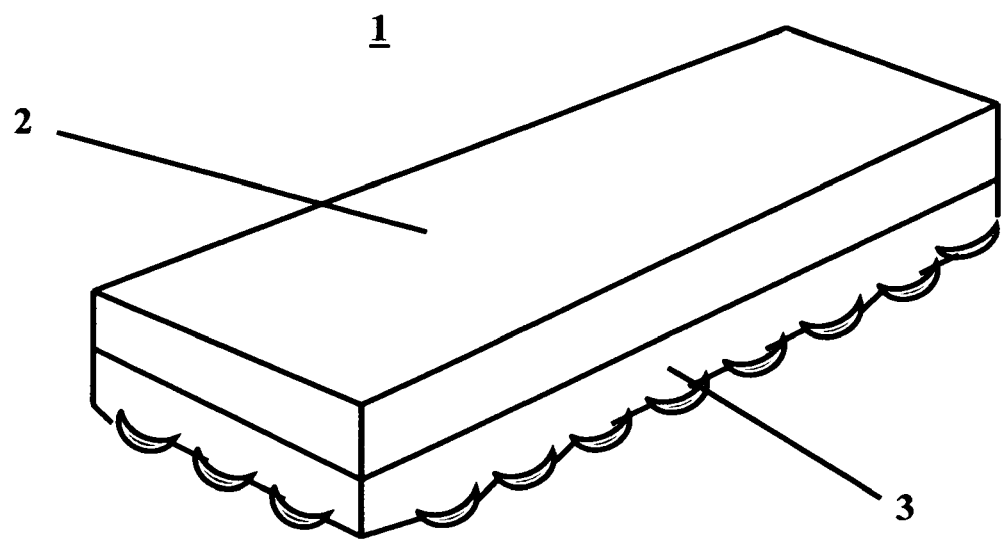
FIG. 1 is a perspective view of one embodiment of a decorative surface covering of the invention.

Referring to the drawings, FIG. 1 is a perspective view of one embodiment of a decorative surface covering 1 of the invention. The decorative layer 2 of the surface covering 1 comprises a 6"×36", Luxury Vinyl Tile Plank, and one embodiment of an elastomeric backing layer 3 of the invention.

Figure 2:
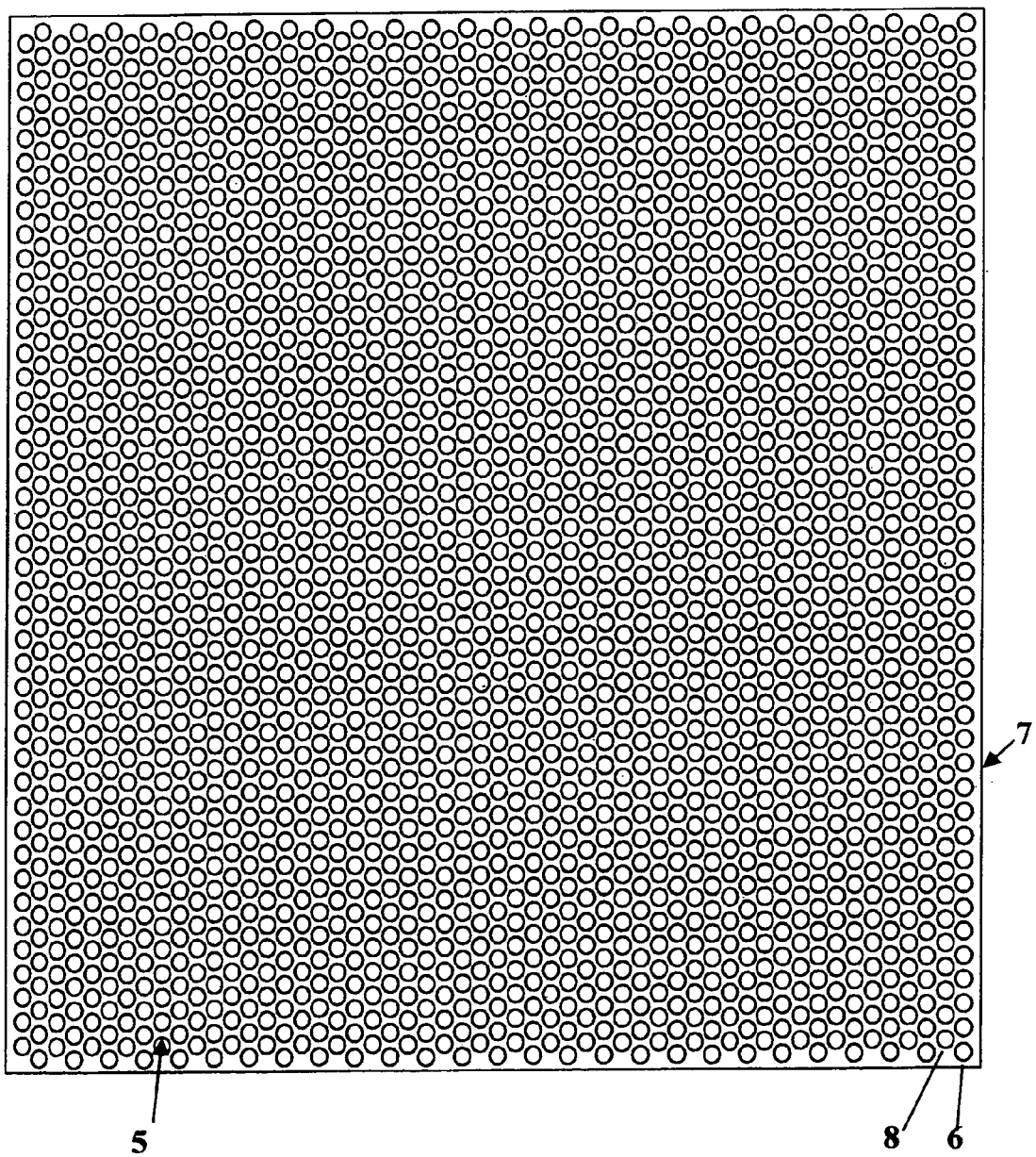
FIG. 2 is a plan view of one embodiment of a patterned array of elastomeric, geometric projections on the exposed face of the backing layer.

FIG. 2 is a plan view of the exposed surface of the elastomeric backing layer showing one embodiment of an array 4 of circle/ring projections 5 on the exposed surface. The pattern array of circles/rings is organized in rows 6 parallel to the decorative layer's longitudinal edge 7, with alternating rows 8 offset on center across the width of the array.

Figure 3:
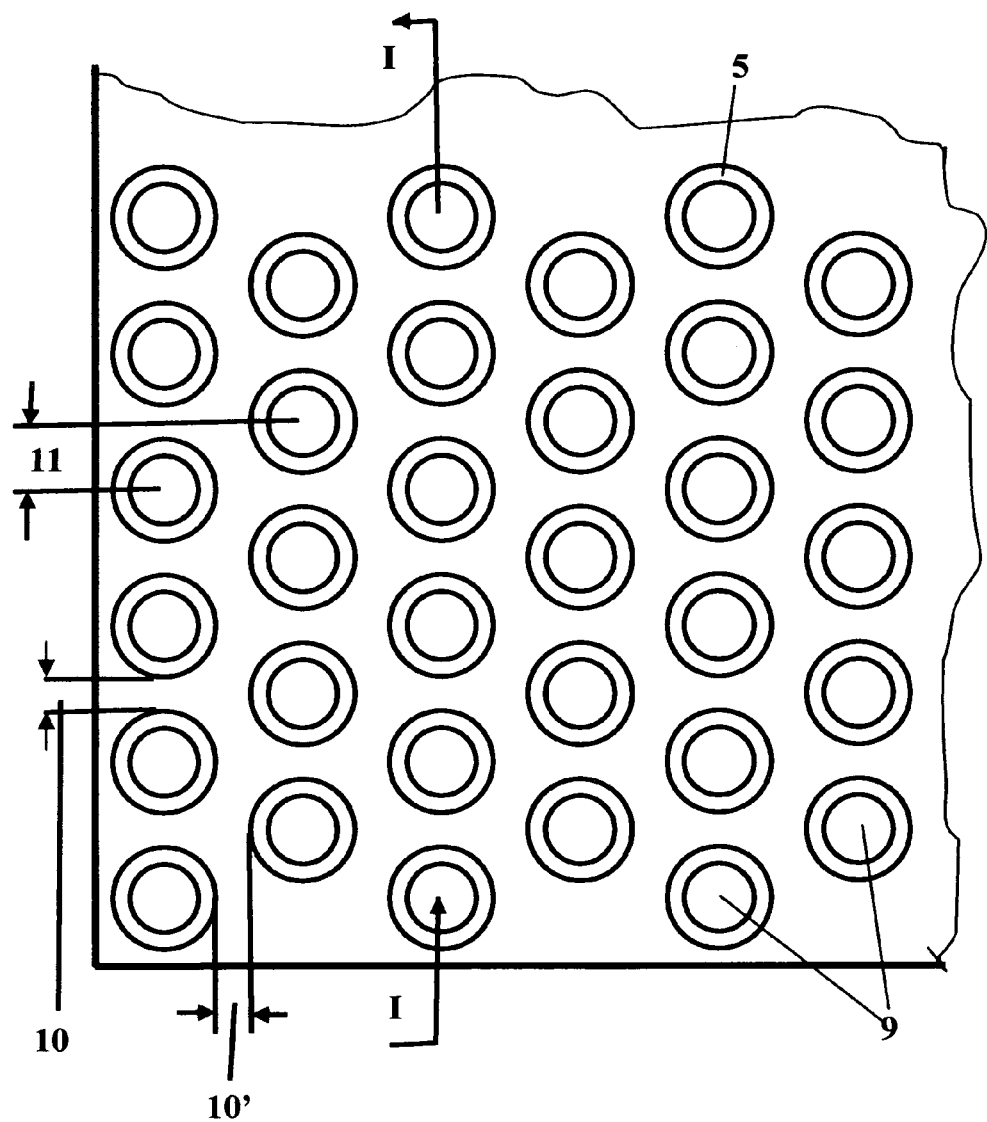
FIG. 3 is an exploded, fragmentary plan view of the patterned array described in FIG. 2.

FIG. 3 is an exploded, fragmentary plan view of the pattern array of geometric projections of FIG. 2. The patterned circles/rings each comprise a hollow area 9 inside each projection 5. and the distance 10 between the rings within the rows and between the rows 10' is 0.044", with the alternating rows off-set 11 0.0975 on center across the width of the array.

Figure 4:
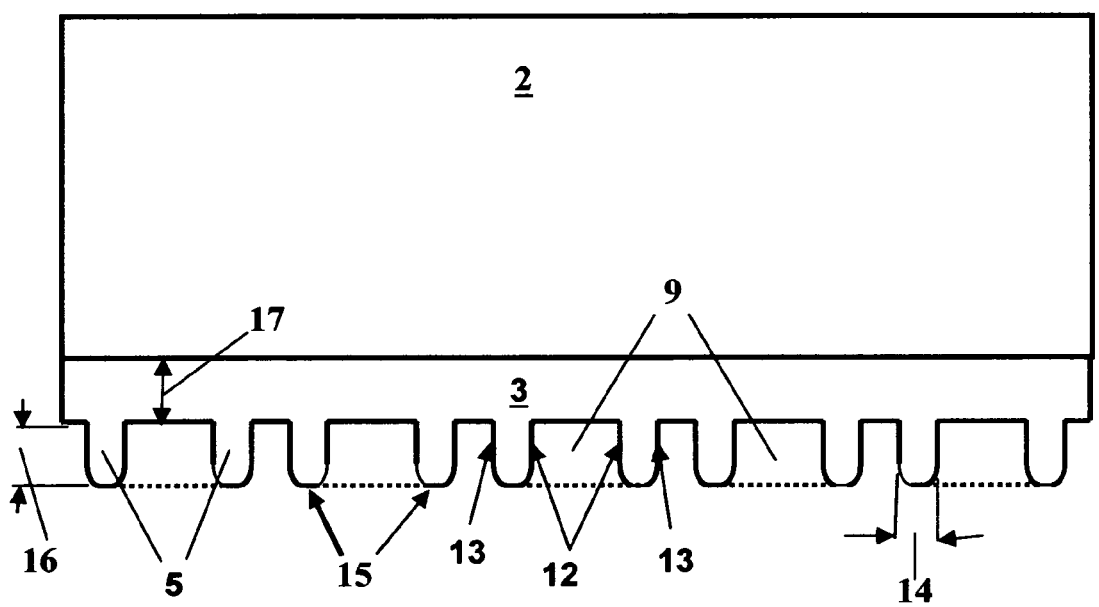
FIG. 4 is a cross-sectional view according to line I-I of FIG. 3

FIG. 4 is a cross-sectional view along line I-I of FIG. 3. In this embodiment, the ring projections 5 are defined by an inside vertical wall surface 12 and an outside vertical wall surface 13, and having an inside diameter of 0.074" and an outside diameter of 0.151" resulting in a ring projection width 14 of 0.0385". The hollow area 9 inside each projection is defined by the inside vertical walls 12. In this embodiment, the exposed surface 15 of each ring projection is concave and the projection extends to a height 16 of 0.004" above the surface of the backing layer which has a thickness 17 of 0.006".

In one embodiment, the decorative layer is a flooring material.

In another embodiment, the decorative layer 2 is selected from the group including a resilient tile, plank, or sheet structure, and laminate plank or tile structure.

In another embodiment, the decorative layer 2 is an 18"×18" Luxury Vinyl Tile.

In another embodiment, the decorative layer 2 is an interlocking Laminate product.

In another embodiment, the geometric projections 5 comprise, triangles, squares, rectangles, ovals, rings/circles, pentagons, hexagons, other polygons, or mixtures thereof.

It is within the scope of this invention to change size, number, shape, and dimensions of the geometric projections 5 depending upon size and shape of the decorative layer 2. Additionally, the array of geometric projections 4 can comprise different geometric shapes and sizes. However, in principle, the hollow projections 5 should be located as close to the edges as practically possible to ensure seam integrity. Additionally, these parameters must be carefully controlled to ensure that the resulting product performs acceptably without adhesive: in particular, during exposure to traffic/walking and rolling loads after installation.

In one embodiment, the geometric shaped projections 5 are symmetrical with dimensions equal in both longitudinal and transverse directions providing maximum adhesion in both directions.

In another embodiment, the geometric projections have the shape of ovals, rectangles, or other geometric shapes with zero, or only one axis of symmetry, and they have a symmetry ratio between major dimension (length) and minor dimension (width) through the "center of figure" of about 2.5 or less. In another embodiment, the symmetry ratio is about 1.5 or less.

The size and distribution of the hollow areas 9 on the backing layer 3 determine the vacuum increase in adhesion to the underlying surface. In one embodiment, the size of the hollow areas 9 have a maximum horizontal dimension from a vertical sidewall through the "center of figure" of the hollow area to the opposite vertical sidewall in the range of 0.020" to 0.250". In another embodiment, the maximum horizontal dimension of the hollow areas where the decorative layer is resilient flooring is in the range of 0.020" to 0.125".

In another embodiment, the number of projections 5 containing hollow areas 9 on the exposed surface of the backing layer 3 is in the range of 2,000 to 6,000 per square foot.

In another embodiment, the width 14 of the geometric projections 5 having the concave surface 15 can also be varied, but is generally in the range of 0.015" to 0.100". Additionally, the ratio of the hollow areas 9 maximum dimension to the width 14 of the geometric projections 5 with the concave surface 15 is typically in the range of 1.5-3.0.

In one embodiment the height 16 of the geometric projections 5 is between 0.002"-0.008". In another embodiment the height 16 of the geometric projections is between 0.003"-0.005". The height 16 of the geometric projections 5 is important in defining the hollow area volume, and the ability to create a vacuum when compression is applied to the decorative surface covering of the invention. The height 16 of the geometric projections 5 can not be too great or horizontal movement of the surface covering during the compression can occur and result in a change of position. The physical properties of the decorative layer 2 influence the preferred height 16 of the geometric projections. Additionally, depending upon the nature of the decorative layer 2, show through of the array 4 of geometric projections 5 also needs to be considered, and may limit the height 16 of the geometric projections 5 so that show through does not occur.

In one embodiment the surface 15 of the geometric projections 5 in contact with the underlying subfloor has a concave surface. This concave surface 15 facilitates creation of a vacuum during compression of the covering. In another embodiment, the concave surface 15 can comprise a flat (non-concave) region. This flat region is located near the center of the surface 15 and not adjacent either vertical wall 12, 13 of the geometric projection 5.

Any elastomeric composition can be utilized for the backing layer that is compatible with the decorative layer 2, provides acceptable physical performance, and possess adequate coefficient of friction properties during installed performance to keep the decorative surface covering in place without adhesive. In one embodiment the elastomeric composition is a flexible vinyl composition including plasticized pvc or pvc/polymeric blend. In another embodiment, rubber materials including thermoplastic and thermoset rubber compositions are employed. These rubber compositions can include, but are not limited to natural or synthetic rubbers, acrylic elastomers, polyester elastomers, polyurethane elastomers, pvc elastomers, polyolefin elastomers, and blends of these materials. These elastomers can comprise homo-polymers, co-polymers, ter-polymers, block co-polymers or blends thereof In one embodiment, the backing layer 2 of the invention can be utilized with traditional Laminate flooring products as the decorative layer. These include the interlocking type of Laminate products. Laminate flooring products such as those described in U.S. Pat. Nos. 6,851,241, and 6,006,486 have found commercial success as "free floating" flooring. These employ a foam underlayment between the Laminate product and the underlying sub-floor. In some cases, the foam underlayment can be attached to the underside of the Laminate product by the manufacturer. We have discovered that utilizing the backing layer 3 of the current invention in place of the traditional foam has some advantages. The backing layer 2 of the current invention not only helps to keep the Laminate in place, but also provides some improvement in impact sound and transmitted sound properties.

The Laminate product structure has increased thickness and stiffness, and show-through of the geometric array of the backing layer 3 is less of an issue. In the case of Laminate products as the decorative layer 2, projection height 16 can be increased. In one embodiment the projection height 16 is in the range of 0.003"-0.040". In another embodiment, the projection height 16 is in the range of 0.003"-0.020".

In one embodiment, the process of manufacturing the decorative surface covering of the invention involves the following steps: Step 1) selecting a decorative layer 2, for example a 6"×36" Luxury Vinyl Tile Plank; Step 2) designing a patterned array 4 of geometric projections 5 to fit size and properties of the selected decorative layer 2; Step 3) manufacturing the backing layer 3 comprising the designed patterned array of geometric projections 5; and Step 4) laminating the backing layer to the decorative layer to produce the product of this invention.

In one embodiment, Step 3) involves making a metal plate or mold that is a "negative" of the designed patterned array of Step 2), applying an elastomeric composition onto the metal plate or mold, and using a determined pressure and heat to cause the elastomeric material to fill the negative plate, thus creating the designed patterned array, At this point, the elastomeric backing layer can be removed from the metal plate or mold and subsequently laminated to the decorative layer, or the decorative layer can be placed onto the elastomeric coated metal plate or mold and laminated to the decorative layer using heat and pressure, and subsequently removed.

In one embodiment, the geometric patterned array was machined into the aluminum plate to the desired depth and shape of the projections. The machining tool was equipped with the desired concave surface and width of the geometric projections.

In another embodiment, the elastomeric composition applied to the metal plate in Step 4 was a plasticized vinyl composition.

There are many other ways to manufacture the backing layer 3. Another method involves preparing a polymeric elastomeric layer, and mechanically embossing the layer using an embossing roll or plate to produce the selected design array of Step 2. This process can be utilized with thermoplastic and thermoset elastomeric compositions. Generally, the thermoset elastomer layer will be embossed before final curing of the thermoset elastomeric composition.

Lamination of the decorative layer 2 and the backing layer 3 comprising the array of geometric projections can be accomplished by many known techniques. In addition to utilizing heat and pressure to accomplish the lamination, the use of an adhesive layer between the decorative layer and the base layer may be required. Many adhesive options exist for this purpose. The only requirement of the adhesive is that it is compatible with the decorative layer 2 and backing layer, and provides acceptable performance during the lifetime of the installed decorative surface covering 1 of this invention. It is understood that the backing layer 3 can be manufactured in sheet form and multiple decorative layers 2 laminated thereto.

It is also understood, that if in the process utilizing the negative metal plate, elastomeric material is only placed within the geometric shapes within the metal plate, and little if any applied over the remaining areas of the plate, it would be possible to transfer only the geometric projections 5 to the underside of the decorative layer 2. In this case the backing layer would comprise only the geometric projections 5 with a height 16 extending from the underside of decorative layer 2.

The proceeding description of the invention has shown and described certain embodiments thereof; however, it is intended by way of illustration and example only and not by way of limitation. Those skilled in the art should understand that various changes, omissions and additions may be made to the invention without departing from the spirit and scope of the invention as defined by the claims.

The invention claimed is:

1. A decorative surface covering comprising at least one decorative layer comprising a resilient Luxury Vinyl Tile and a backing layer comprising a patterned array of elastomeric, geometric projections, wherein each geometric projection comprises a concave top surface, an outside wall surface and an inside wall surface wherein the inside wall surface defines a hollow area within the projection.

2. The decorative surface covering of claim 1, wherein the decorative surface covering is a flooring installed over an underlying surface, and when pressure is applied to the decorative surface covering, a vacuum is created within the hollow area of the projections and the underlying surface and thus allowing the surface covering to remain in place without the need for an adhesive.

3. The decorative surface covering of claim 1, wherein the geometric projections comprise, triangles, squares, rectangles, ovals, circles, pentagons, hexagons, other polygons, or mixtures thereof.

4. The decorative surface covering of claim 3, wherein the geometric projections are symmetrical with dimensions essentially equal in both longitudinal and transverse directions.

5. The decorative surface covering of claim 1, wherein the pattern array of geometric projections is organized in rows parallel to the edges of the decorative layer and separated from each other by a defined distance.

6. The decorative surface covering of claim 5, wherein alternating rows of the pattern array are offset from each other by a defined distance.

7. The decorative surface covering of claim 1, wherein the geometric projections have a height above the backing layer in the range of 0.002" to 0.008".

8. The decorative surface covering of claim 7, wherein the geometric projections have a height above the backing layer in the range of 0.003" to 0.005".

9. The decorative surface covering of claim 1, wherein the maximum dimension of the hollow area within the projection is in the range of 0.020" to 0.250".

10. The decorative surface covering of claim 9, wherein the maximum dimension of the hollow area within the projection is in the range of 0.030" to 0.125".

11. The decorative surface covering of claim 1, wherein the thickness of the geometric projection with the concave surface is in the range of 0.015" to 0.100".

12. The decorative surface covering of claim 1, wherein the ratio of the hollow areas maximum dimension to the width of the projections with the concave surface is in the range of 1.5-3.0.

13. The decorative surface covering of claim 1, wherein the number of geometric projections is in the range of 2,000 to 6,000 per square foot of the backing layer.

14. The decorative surface covering of claim 1, wherein the decorative layer comprises a Laminate product.

15. A decorative surface covering comprising at least one decorative layer comprising a resilient Luxury Vinyl Plank and a backing layer comprising a patterned array of elastomeric, geometric projections, wherein each geometric projection comprises a concave top surface, an outside wall surface and an inside wall surface wherein the inside wall surface defines a hollow area within the projection.

16. The decorative surface covering of claim 15, wherein the decorative surface covering is a flooring installed over an underlying surface, and when pressure is applied to the decorative surface covering, a vacuum is created within the hollow area of the projections and the underlying surface and thus allowing the surface covering to remain in place without the need for an adhesive.

17. The decorative surface covering of claim 15, wherein the geometric projections comprise, triangles, squares, rectangles, ovals, circles, pentagons, hexagons, other polygons, or mixtures thereof.

18. The decorative surface covering of claim 17, wherein the geometric projections are symmetrical with dimensions essentially equal in both longitudinal and transverse directions.

19. The decorative surface covering of claim 15, wherein the pattern array of geometric projections is organized in rows parallel to the edges of the decorative layer and separated from each other by a defined distance.

20. The decorative surface covering of claim 19, wherein alternating rows of the pattern array are offset from each other by a defined distance.

21. The decorative surface covering of claim 15, wherein the geometric projections have a height above the backing layer in the range of 0.002" to 0.008".

22. The decorative surface covering of claim 21, wherein the geometric projections have a height above the backing layer in the range of 0.003" to 0.005".

23. The decorative surface covering of claim 15, wherein the maximum dimension of the hollow area within the projection is in the range of 0.020" to 0.250".

24. The decorative surface covering of claim 23, wherein the maximum dimension of the hollow area within the projection is in the range of 0.030" to 0.125".

25. The decorative surface covering of claim 15, wherein the thickness of the geometric projection with the concave surface is in the range of 0.015" to 0.100".

26. The decorative surface covering of claim 15, wherein the ratio of the hollow areas maximum dimension to the width of the projections with the concave surface is in the range of 1.5-3.0.

27. The decorative surface covering of claim 15, wherein the number of geometric projections is in the range of 2,000 to 6,000 per square foot of the backing layer.

28. The decorative surface covering of claim 15, wherein the decorative layer comprises a Laminate product.

* * * * *